Jan. 15, 1952     W. F. ALBRECHT     2,582,370
VALVE
Filed Sept. 26, 1947
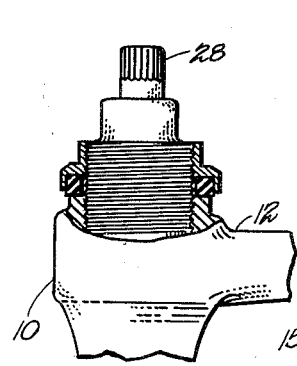
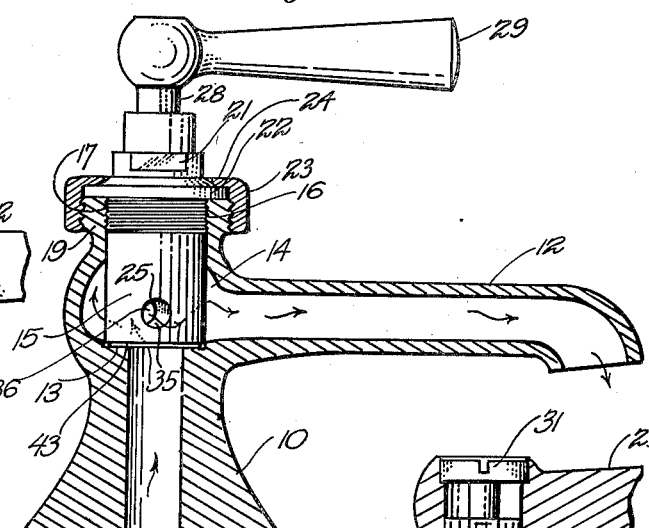
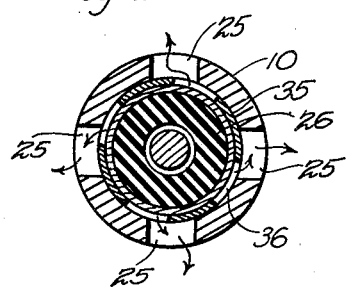
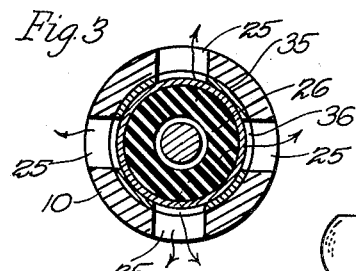
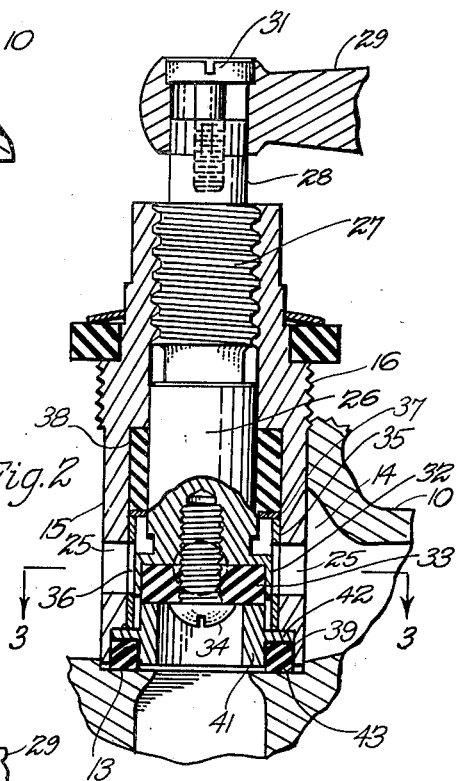
INVENTOR.
William F. Albrecht
BY Victor J. Evans & Co.
ATTORNEYS Patented Jan. 15, 1952

2,582,370

UNITED STATES PATENT OFFICE 2,582,370

VALVE

William F. Albrecht, Salt Lake City, Utah

Application September 26, 1947, Serial No. 776,221

2 Claims. (Cl. 277—64)

This invention relates to a valve.

It is an object of the present invention to provide a valve which can be regulated to discharge different volumes of water when the valve is opened after the adjustable element has been previously set within the valve.

It is another object of the present invention to provide a valve which is of the adjustable type and of simple construction, inexpensive to manufacture, and efficient in operation.

For a better understanding of the invention, reference may be had to the following detailed description taken in connection with the accompanying drawings, in which Fig. 1 is a cross-sectional view, in elevation, of the valve embodying the features of the present invention, Fig. 2 is an enlarged cross-sectional view taken through the washer retaining parts, Fig. 3 is a transverse cross-sectional view taken on line 3—3 of Fig. 2, Fig. 4 is a transverse cross-sectional view taken on line 3—3 of Fig. 2 but with the adjusting sleeve to control the volume set so that the water leaving the valve will be less than when the sleeve is adjusted to the position shown in Fig. 3, Fig. 5 is a fragmentary side elevational view of the valve showing portions broken away and the connection of the washer and adjusting sleeve parts, Fig. 6 is a fragmentary sectional view taken through the top of the valve having a modified lock nut.

Referring now to the figures, 10 represents a main valve body having a threaded shank 11 which is hollow for the ingress therethrough of liquid and is adapted to be extended into a pipe and an outlet extension 12. The body has a valve seat 13 at the bottom of a chamber 14. Into the chamber 14 there is extended a gasket and adjustable sleeve retaining member 15. This retaining member has external threads 16 cooperating with internal threads 17 of a projection 19 at the top of the valve body 10. The retainer 15 has a shoulder 21 to which a wrench may be applied to tighten the retainer upon the valve seat 13. The washer 22 is extended above the retainer and is held upon the top of the projection 19 by a lock nut 23 having an inwardly extending flange 24 cooperating with the top of the washer 22. The retainer 15 has a plurality of holes 25 circumferentially spaced therearound and through which water enters the outlet chamber 14. Adjustable in the retainer is a central member 26 having fast threads 27 thereon. A stem 28 projects from the upper end of the same and to this a handle 29 is splined and made fixed by a top screw 31. As the handle 29 is turned the member 26 will be moved up or down within the retainer 15. The lower end of the member 26 has a skirt portion 32 in which is fixed a gasket 33 by a screw 34 entering the lower end of the member 26. Surrounding the skirt portion 32 is a sleeve 35 having a plurality of holes 36 therein spaced the same as the holes 25 in the retainer. The upper end of the sleeve 35 bears against a washer 37 which is forced downwardly by a resilient packing 38. This sleeve 35 can be adjusted to vary the volume of water leaving the valve. If the sleeve is adjusted as shown in Fig. 4 so that its openings 36 are offset to the openings 25 of the retainer less water will pass through the valve. If the sleeve is adjusted as shown in Fig. 3 there will be a maximum flow of water from the valve.

The lower end of the retainer 15 is recessed as indicated at 39 to receive a ring 41 having a flange 42 thereon adapted to fit the recess 39. This ring retains a washer 43 and as the retainer 15 is tightened downwardly upon the seat 13 the washer 43 will engage tightly therewith and the ring 41 will be retained by its flange within the end of the retainer 15. As the member 26 is lifted, washer 33 which in its down position engages with the top of the ring 41, will be lifted to permit the flow of water radially outwardly through the openings 36 and 25.

To readjust the sleeve 35, the retainer 15 is withdrawn from the valve body 10 and the adjustment effected by reaching into the inner end of the retainer 15 to turn the sleeve.

In Fig. 6 lock nut 23 has a cap portion 23'.

While various changes may be made in the detail construction, it shall be understood that such changes shall be within the spirit and scope of the present invention as defined by the appended claims.

I claim:

1. In a valve, a main valve body provided with an outlet discharge chamber, there being a seal seat arranged in said body, said valve body having an inlet passage extending therethrough and communicating with said outlet chamber, a projection extending from said main body, a hollow retaining member extending through said projection and adapted to move towards and away from said seal seat, a ring provided with a flange and an upstanding seat positioned within said retaining member, a washer surrounding said ring and arranged to engage with said seal seat upon movement of said hollow retaining member toward the seal seat, a central member arranged in said hollow retaining member and mounted for longitudinal movement through the latter and provided with head means cooperable with said ring seat to control flow through said ring, said retaining member being provided with a plurality of openings in the walls thereof, a resilient packing arranged in embracing relation with respect to said central member and in sealing engagement with said retaining member, and an adjustable sleeve interposed between said packing and the flange of said ring, said sleeve having openings therein adapted to variably register with the openings in the wall of the retaining member for controlling the flow of liquid from the inlet passage to the outlet chamber, and manually operable means for adjusting said central member.

2. The apparatus as described in claim 1, wherein said head means includes a gasket positioned between said ring and central member and secured to the latter, and a skirt portion depending from said central member and embracing said gasket.

WILLIAM F. ALBRECHT.

REFERENCES CITED

The following references are of record in the file of this patent:

UNITED STATES PATENTS

| Number | Name | Date |
| --- | --- | --- |
| 1,277,413 | Haynes | Sept. 3, 1918 |
| 1,383,005 | Mertens | June 28, 1921 |
| 1,736,368 | Ricard | Nov. 19, 1929 |
| 1,898,816 | Crossen | Feb. 21, 1933 |
| 1,935,899 | Yarnall | Nov. 21, 1933 |
| 1,988,966 | Eckhouse | Jan. 22, 1935 |

FOREIGN PATENTS

| Number | Country | Date |
| --- | --- | --- |
| 552,435 | France | of 1923 |
| 594,302 | France | Sept. 10, 1925 |
| 751,706 | France | Sept. 8, 1933 |